(12) United States Patent
Sharma et al.

(10) Patent No.: US 10,270,658 B2
(45) Date of Patent: Apr. 23, 2019

(54) ZERO TOUCH CONFIGURATION AND SYNCHRONIZATION OF A SERVICE APPLIANCE IN A NETWORK ENVIRONMENT

(71) Applicant: CISCO TECHNOLOGY, INC., San Jose, CA (US)

(72) Inventors: Samar Sharma, San Jose, CA (US); Mitali Parthasarathy, Sunnyvale, CA (US); Avni Baveja, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 14/710,389

(22) Filed: May 12, 2015

(65) Prior Publication Data

US 2016/0094394 A1    Mar. 31, 2016

Related U.S. Application Data

(60) Provisional application No. 62/057,870, filed on Sep. 30, 2014.

(51) Int. Cl.
*G06F 15/16* (2006.01)
*H04L 12/24* (2006.01)

(52) U.S. Cl.
CPC ...... *H04L 41/0886* (2013.01); *H04L 41/0806* (2013.01)

(58) Field of Classification Search
CPC .................. H04L 41/0886; H04L 41/0086
USPC ....................................................... 709/223
See application file for complete search history.

(56) References Cited

U.S. PATENT DOCUMENTS

| | | | |
|---|---|---|---|
| 7,203,740 B1 | 4/2007 | Putzolu et al. | |
| 7,302,487 B2 | 11/2007 | Ylonen | |
| 7,460,527 B2 * | 12/2008 | Ghosh | H04L 45/00 370/360 |
| 8,775,577 B1 | 7/2014 | Alford | |
| 9,246,702 B1 * | 1/2016 | Sharma | H04L 12/2896 |
| 2002/0097687 A1 | 7/2002 | Meiri | |
| 2005/0108331 A1 | 5/2005 | Osterman | |
| 2005/0198371 A1 | 9/2005 | Smith et al. | |

(Continued)

OTHER PUBLICATIONS

Cisco: "Cisco Remote Integrated Sevice Engine for Citrix NetScaler Appliances and Cisco Nexus 7000 Series Switches Configuration Guide", Apr. 29, 2014, Cisco Systems Inc., pp. 1-67.*

(Continued)

*Primary Examiner* — Kevin T Bates
*Assistant Examiner* — Clarence D McCray

(57) ABSTRACT

An example method for zero touch configuration and synchronization of a service appliance in a network environment includes receiving, at an appliance port on a service appliance, an indication that a switch port on a switch changed from an inactive status to an active status, the appliance port being connected over a network to the switch port, starting a bootstrap protocol, including by receiving at the service appliance from the switch, a bootstrap message from a service executing in the switch, creating, by the service appliance, an empty port channel at the service appliance, adding, by the service appliance, the appliance port to the port channel, and associating, by the service appliance, the service to the port channel in a cache.

20 Claims, 5 Drawing Sheets

(56) References Cited

U.S. PATENT DOCUMENTS

| | | | |
|---|---|---|---|
| 2006/0077909 | A1 | 4/2006 | Putzolu et al. |
| 2006/0159032 | A1 | 7/2006 | Ukrainetz |
| 2007/0195794 | A1 | 8/2007 | Fujita et al. |
| 2011/0103259 | A1 | 5/2011 | Aybay |
| 2011/0225207 | A1 | 9/2011 | Subramanian et al. |
| 2013/0107709 | A1 | 5/2013 | Campbell |
| 2013/0242999 | A1 | 9/2013 | Kamble |
| 2014/0092884 | A1 | 4/2014 | Murphy |
| 2014/0137109 | A1 | 5/2014 | Sharma |
| 2015/0081855 | A1* | 3/2015 | Zhang .............. H04L 41/12 709/220 |
| 2015/0215183 | A1* | 7/2015 | Bucci .............. H04L 43/12 370/252 |

OTHER PUBLICATIONS

U.S. Appl. No. 14/492,008, filed Sep. 20, 2014, entitled "Discovery Protocol for Enabling Automatic Bootstrap and Communication With a Service Appliance Connected to a Network Switch," Inventors: Samar Sharma et al.

U.S. Appl. No. 14/490,504, filed Sep. 18, 2014, entitled "Handshake Mechanism for Offloading Service Appliacne Feature to Switch," Inventors: Samar Sharma et al.

Cisco Systems, Inc. "Cisco Data Center Network Architecture and Solutions Overview," Feb. 2006, 19 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007; 66 pages.

Cisco Systems, Inc., "Cisco Application Control Engine (ACE) Troubleshooting Guide—Understanding the ACE Module Architecture and Traffic Flow," Mar. 11, 2011, 6 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Foundation for Intelligent Physical Agents, "FIPA Agent Message Transport Service Specification," Dec. 3, 2002, http://www.fipa.org; 15 pages.

Cisco Systems, Inc., "Cisco VN-Link: Virtualization-Aware Networking," White Paper, Mar. 2009, 10 pages.

Cisco Systems, Inc., "VMWare and Cisco Virtualization Solution: Scale Virtual Machine Networking," Jul. 2009, 4 pages.

Brocade Communications Systems, Inc., "Chapter 5—Configuring Virtual LANs (VLANs)," Jun. 2009, 38 pages.

USPTO—Documents from U.S. Appl. No. 13/362,227 (now U.S. Pat. No. 9,246,702 on Jan. 26, 2016).

\* cited by examiner

ZERO TOUCH CONFIGURATION AND SYNCHRONIZATION OF A SERVICE APPLIANCE IN A NETWORK ENVIRONMENT

CROSS REFERENCE TO RELATED APPLICATIONS

This application claims the benefit of priority under 35 U.S.C. § 119(e) to U.S. Provisional Application Ser. No. 62/057,870 entitled "CONFIGURATION AND DYNAMIC SYNCHRONIZATION OF A SERVICE APPLIANCE," filed Sep. 30, 2014, which is hereby incorporated by reference in its entirety.

TECHNICAL FIELD

This disclosure relates in general to the field of communications and, more particularly, to zero touch configuration and synchronization of a service appliance in a network environment.

BACKGROUND

Data centers are increasingly used by enterprises for effective collaboration and interaction and to store data and resources. A typical data center network contains myriad network elements, including servers, load-balancers, routers, switches, etc. The network connecting the network elements provides secure user access to data center services and an infrastructure for deployment, interconnection, and aggregation of shared resource as required, including applications, servers, appliances and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance. For example, advanced data center network fabric built with highly resilient scalable platforms can integrate intelligent services directly into the fabric. Infrastructure enhancing services improve the reliability and security of the hosted infrastructure and applications and allow centralization of heterogeneous services that were previously only available as distributed services on end systems like storage and servers. Service appliances that deliver such centralized network services allow unified administration, improved performance and other advantages.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for zero touch configuration and synchronization of a service appliance in a network environment is provided and includes receiving, at an appliance port on a service appliance, an indication that a switch port on a switch changed from an inactive status to an active status, the appliance port being connected over a network to the switch port, starting a bootstrap protocol, including by receiving at the service appliance from the switch, a bootstrap message from a service executing in the switch, creating, by the service appliance, an empty port channel at the service appliance, adding, by the service appliance, the appliance port to the port channel, and associating, by the service appliance, the service to the port channel in a cache (e.g., memory element, database, storage device, etc.).

As used herein, the term "port channel" refers to a port link aggregation technology that allows grouping several physical communication links (e.g., Ethernet links) to create one logical link (e.g., for providing fault-tolerance and high-speed links between various network elements). Typically, the port channel aggregates traffic across all available active ports in the channel. Each port is selected into the port channel using a hash algorithm, for example, based on source or destination Media Access Control (MAC) addresses, Internet Protocol (IP) addresses or port numbers.

Example Embodiments

Figure 1:
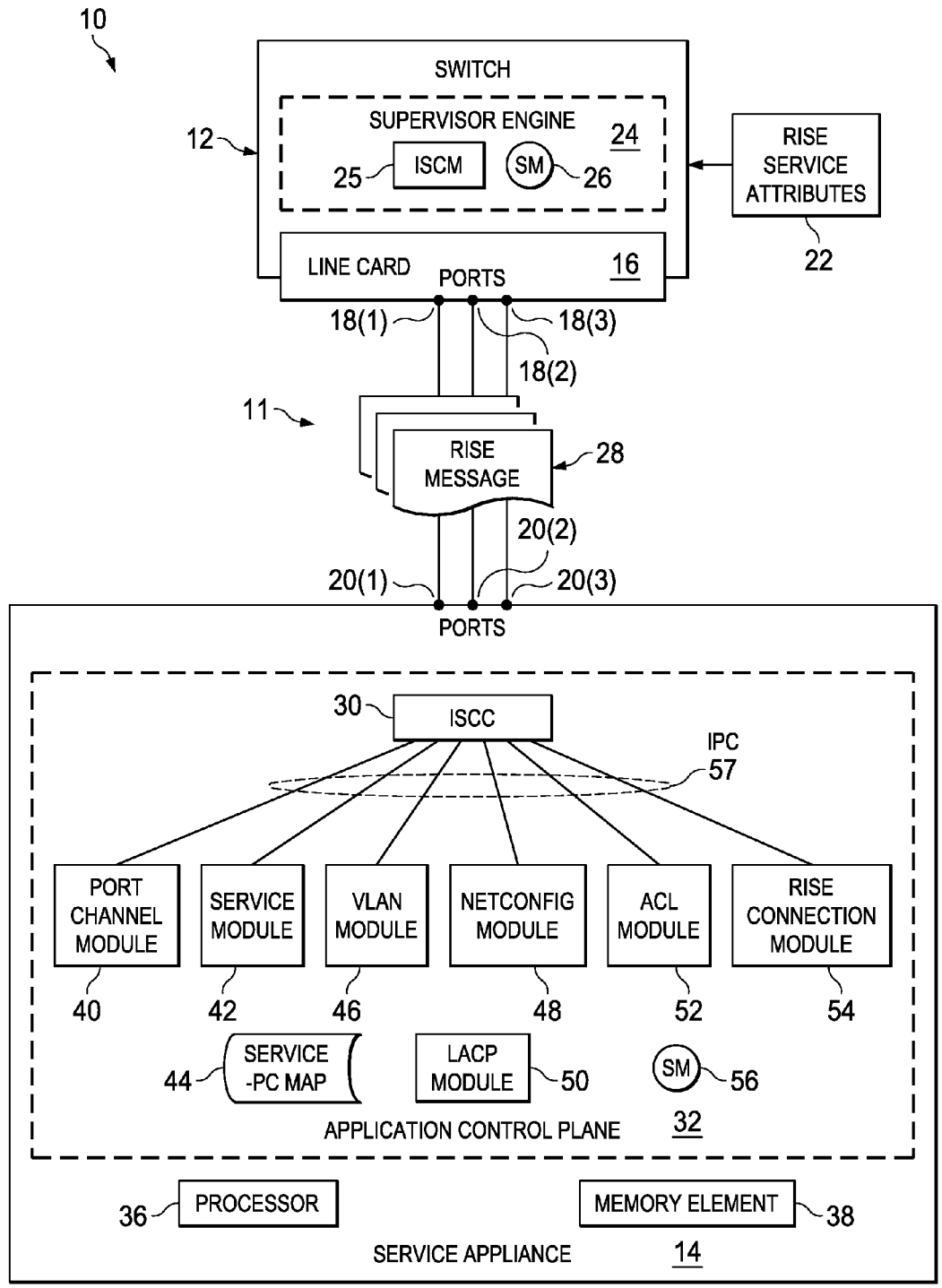
FIG. 1 is a simplified block diagram illustrating a communication system that facilitates zero touch configuration and synchronization of a service appliance in a network environment in accordance with one embodiment.

Turning to FIG. 1, FIG. 1 is a simplified block diagram illustrating a communication system 10 that facilitates zero touch configuration and synchronization of a service appliance in a network environment in accordance with one embodiment. Communication system 10 includes a network 11 that connects a switch 12 to a service appliance 14 through a line card 16 of switch 12. As used herein, a "service appliance" is a discrete (and generally separate) hardware device with integrated software (e.g., firmware), specifically designed to provide one or more network services, including load-balancing, firewall, intrusion prevention, virtual private network (VPN), proxy, etc. Line card 16 may include one or more switch ports 18, for example, switch ports 18(1)-18(3). Switch ports 18 may connect to corresponding appliance ports 20 (e.g., 20(1)-20(3)) on service appliance 14. Switch 12 and service appliance 14 may communicate using a Remote Integrated Service Engine (RISE) protocol (among other protocols).

A network administrator or other human user may input certain RISE service attributes 22 to switch 12. RISE service attributes 22 include, by way of examples, and not as limitations, network segments (e.g., virtual local area network (VLAN)), network identifiers (e.g., RISE Internet Protocol (IP) address, Netmask), communication channel properties (e.g., port channel), etc. A supervisor engine 24 in switch 12 may initiate an intelligent service card manager process (iSCM) 25 thereon to communicate RISE service attributes 22 (among other information) to service appliance 14. A state machine (SM) 26 running in supervisor engine 24 may identify any changes between locally stored network parameters (including previously stored RISE service attributes) and RISE service attributes 22. iSCM 25 may transform (e.g., aggregate, format, etc.) information in RISE service attributes 22 into a RISE message 28 and communicate RISE message 28 to an intelligent service card client process (iSCC) 30 executing in an application control plane 32 of service appliance 14. iSCM 25 and iSCC 30 form part of a RISE infrastructure provisioned in communication system 10.

In various embodiments, service appliance 14 is provisioned with a variety of platform components (e.g., modules, software units that expose various features such as well specified interface and explicit dependencies, customizable, amenable to be assembled appropriately, reusable by nature, provide a unit of delivery and deployment) that facilitate zero touch configuration and synchronization of service appliance 14. In addition to a processor 36 and a memory element 38, the platform components include, by way of examples, a port channel (PC) module 40, a service module 42, a service-PC map 44, a VLAN module 46, a netconfig module 48, a Link Aggregation Control Protocol (LACP) module 50, an Access Control List (ACL) module 52, a RISE connection module 54, and a state machine 56. ISCC 30 may communicate with the various platform components using appropriate Inter-Process Communication (IPC) 57 (e.g., User Datagram Protocol (UDP)).

According to embodiments of communication system 10, substantially all configuration and provisioning of services in service appliance 14 may be made via switch 12, instead of on service appliance 14. Various configuration settings is transmitted to service appliance 14 from switch 12 using an appropriate data structure. In some examples, the data structure comprises a plurality of fields wherein each of the plurality of fields is encoded as a type-length-value (TLV). In such an example, each of the plurality of fields may correspond to an attribute of service appliance 14, or application component (e.g., service) that is to be set (or configured) in service appliance 14. The attributes may be defined in a platform specific programming language; the fields may be converted from the TLV to platform specific instructions before apply configuration settings. The configuration information (e.g., comprising configuration settings) can be parsed by ISCC 30, decrypted (e.g., if the information is encrypted), and transmitted to an application component (e.g., including platform components) using IPC 57. The platform component may automatically configure various parameters based on the configuration information received over IPC 57.

For purposes of illustrating the techniques of communication system 10, it is important to understand the communications in a given system such as the communication system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load-balancing, firewall, intrusion prevention, proxy, virtual private network (VPN), etc. are provided through one or more service appliances. Typical service appliances (e.g., load-balancers) integrate services such as load balancing, firewall, intrusion prevention, VPN, etc. in a single box format, generally based on modular, scalable platforms and provide a cost-effective option. Service appliances are typically connected externally to a switch (e.g., aggregate switch or access switch, etc.) via appropriate ports. Different service appliances are designed with specific features applicable to different network environments. The service appliances may be deployed independently to service specific areas of the network infrastructure, or they may be combined for a layered approach. Service appliances are typically located between the clients and server farms. All data packets generally pass through the service appliances on the way to (and from) the servers/clients. The service appliances may be managed by a management application (e.g., software) on the service appliance that enables configuration settings and other management functions.

Service appliances are typically configured with network control plane, network data plane, and application planes (comprising application control plane and application data plane). Service appliances usually communicate only data plane messages with external network elements; control messages are internal, within the service appliance. Packets sent from (and to) clients are routed through the service appliance and processed by applications in the service appliance before being forwarded to their intended destinations. Because service appliances perform network specific (L2/L3) control plane and data plane operations (in addition to application specific functions), any network specific configuration changes must be propagated to the service appliance.

For example, load-balancers are typically located near the very end of solution delivery at data center server farms, and are mostly managed by application/server administrators. On the other hand, the configurations on the switches, routers etc. are handled by network administrators. Load-balancers have specific networking configurations like port channel, VLANs, etc., and load-balancer specific configurations, such as load-balance policies. Any change in the network configuration of the load-balancer (or change in network topology that could affect load-balancer configurations) would typically require the application administrators and network administrators to manually configure the load-balancer appropriately.

However, currently available service appliances such as load-balancers, firewalls and analysis modules are difficult and complex to configure manually. Further, large network size and complexity add to the challenges. Due to the huge complexity of configuration, orchestration and deployment there are many challenges in setting up the network appropriately. Administrators have to deal with configuring multiple devices. Often, the devices are owned by different administrative groups, potentially causing delays in deployment and manual configuration is prone to human errors with consequent network outages.

Moreover, service appliances may have to be compatible with particular features on the switches to which they are connected. The service appliance may have to support particular routing protocols or be compatible with network features like locator/identifier separation protocol (LISP), fabric-path, etc. that are supported by the switch. Further, when a service appliance is connected to a switch, the service appliance has to be configured separately for each VLAN connected to the switch. If separate VLANs are provisioned for different client traffic is connected to the switch, the separate VLANs must be provisioned in the service appliance as well. Similarly, if any of the server side VLANs change, the change must be accounted for in the service appliance through a reconfiguration of the service appliance.

Furthermore, the network has to respond to increasing rate of growth of the Internet and data centers through increasingly smart and intelligent devices. Virtualization, cloud based networking, increased port density, and other such network architecture changes have increased the number of devices connecting to switches. Thus, configuring each network device manually can become cumbersome and error-prone.

Communication system 10 is configured to address these issues (and others) in facilitating zero touch configuration and synchronization of service appliance 14 in network 11. Embodiments of communication system 10 can advantageously reduce the number of steps required to configure service appliance 14 (and/or network 11 comprising a plurality of service appliances 14). In some implementations, communication system 10 can provide an initial setup (e.g., "bring-up") and deploy a first-time service appliance 14. In addition, embodiments of communication system 10 can provide switches (e.g., switch 12) with logic to change a run-time, network-related configuration on service appliances (e.g., service appliance 14) and which may be utilized during maintenance and upgrades.

In various embodiments, service appliance 14 may receive, at one of appliance ports 20 (e.g., 20(1)), an indication that one of switch ports 18 (e.g., 18(1)) changed from an inactive status to an active status, appliance port 20(1) being connected over network 11 to switch port 18(1). Service appliance 14 may start a bootstrap protocol, including by receiving at service appliance 14 from switch 12, a bootstrap message, comprising RISE message 28 from a service (e.g., RISE service) executing in switch 12 (e.g., at iSCM 25). Service appliance 14 may create an empty port channel at service appliance 14, and add appliance port 20(1) to the port channel. Service appliance 14 may associate the service to the port channel in a cache, such as service-PC map 44.

In particular embodiments, RISE message 28 (e.g., bootstrap message) includes a payload with a plurality of RISE service attributes 22 indicative of configuration settings of service appliance 14. iSCC 30 may communicate RISE service attributes 22 in the payload to platform components in service appliance 14 using an appropriate data structure, and the platform components may apply configuration settings to service appliance 14 based on RISE service attributes 22.

In some embodiments, service appliance 14 may receive, at another of second appliance ports 20 (e.g., 20(2)) an indication that another of switch ports 18 (e.g., 18(2)) changed from an inactive status to an active status. Service appliance 14 may restart the bootstrap protocol and add the second appliance port to the port channel. Restarting the bootstrap protocol may include receiving at appliance port 20(2), a second bootstrap message associated with the service, and associate the service with the port channel in a second cache, the second cache indicating second appliance port 20(2). SM 56 at service appliance 14 may compare the second cache with the previously stored cache, and add second appliance port 20(2) based on the detected difference.

In some embodiments, service appliance 14 may receive from switch 12 at second appliance port 20(2) yet another bootstrap message from the service and add the second appliance port to the port channel. Such may be the case, for example, when second appliance port 20(2) is already active, but not part of the port channel for the service (e.g., it may be a member of another port channel).

In various embodiments of communication system 10, when service appliance 14 is added to (e.g., coupled to) switch 12, switch 12 may instruct service appliance 14 to execute the following (non-limiting) list of example procedures (e.g., to enable automated configuration): automatic port channel creation between switch 12 and service appliance 14, automatic assignment of RISE IP address and control VLAN, automatic configuration download of RISE service attributes 22 on service appliance 14 from switch 12, automatic creation of ACLs on service appliance 14 from switch 12, automatic configuration of network parameters, such as VLANs and VLAN groups, and automatic configuration of access control, users and roles on service appliance 14.

Communication system 10 can reduce deployment time and complexity with fewer steps and points of contact. For example, a typical load-balancer may require 30 manual steps for configuration (including switch configuration, console configuration, management configuration, licensing configuration, web graphical user interface configuration, and data network configuration); in contrast, load-balancers according to embodiments of communication system 10 may be configured with approximately eight manual steps confined to switch configuration, reducing the number of manual configuration steps four-fold.

In particular embodiments, switch 12 instructs service appliance 14 to configure interfaces and port-channels for connectivity between switch 12 and service appliance 14. A user can increase and/or reduce port channel capacity on the fly (e.g., without stopping service appliance 14 and reconfiguring it) through manual configuration of switch 12 (e.g., by changing port channel parameters in RISE service attributes 22). The manual configuration is transformed by iSCM 25 on switch 12 into an appropriate RISE message 28 comprising instructions to service appliance 14 to execute the configuration.

Further, embodiments of communication system 10 advantageously allow port channel capacity to be modified without disrupting all port channels in a port channel group (e.g., a collection of port channels). Instead, communication system 10 can enable selectively modifying only a portion of port channels in a port channel group (e.g., by comparing current and previous members of a port channel group and updating the port channel capacity based on identified differences between the current and previous members the port channel group). By utilizing the difference between a previous state and a current state of a port channel group, port channels may be added to and/or deleted from a port channel group without disrupting other port channels in the port channel group.

Through RISE message 28, switch 12 can also instruct service appliance 14 to establish a TCP channel for communication e.g., for transmitting/receiving signals between the switch and the service appliance). Switch 12 automatically assigns an IP address (e.g., a RISE IP address) to service appliance 14. Switch 12 transmits the IP address to service appliance 14 via RISE message 28. Service appliance 14 receives the IP address from switch 12 and may store the assigned IP address (e.g., in a database).

Switch 12 can instruct service appliance 14 to create and configure L2 VLANs and/or L3 interfaces on service appliance 14. For example, switch 12 may transmit L2/L3 VLANs to service appliance 14. In addition to the VLANs, switch 12 may transmit a plurality of fields (e.g., comprised in a data structure) to service appliance 14. Each of the plurality of fields may be encoded as a type-length-value (TLV). Some of the fields may correspond to a configuration setting for the VLANs (e.g., IP address/masks associated with L3 VLANs).

Switch 12 can configure ACLs, default routes and other routes and policies, for example, to enable traffic pull and push to service appliance 14 through appropriate fields in RISE message 28. In various embodiments, switch 12 can configure basic network services such as LACP, Netmask, domain name system (DNS) service, network time protocol (NTP), etc. through one or more RISE message 28. In some embodiments, access control, such as user names/passwords, users and roles may be added on service appliance 14 by switch 12. User roles and credentials like usernames/passwords may be automatically configured on service appliance 14.

In various embodiments, in addition to RISE service attributes 22, switch 12 may communicate various other information, such as virtual device contexts (VDCs), VLANs, In-Service Software Upgrades (ISSU), and VLAN auto-states, to service appliance 14; service appliance 14 may communicate various information such as route health injection (RHI), Auto-Policy-Based-Routing (Auto-PBR), ACLs, application status, statistics and license information, etc. to switch 12. In various embodiments, RISE, implemented as iSCC 30 in service appliance 14, and counterpart iSCM 25 in switch 12, can provide a plug-and-play approach to automatically configure service appliance 14 with various RISE service attributes 22.

According to various embodiments, iSCM 25 may offer various functionalities such as handling (i.e., accommodating, managing, processing, etc.) RISE messages (e.g., in Message Transport Service (MTS) format), high availability activities, timer events, packet switch stream (PSS), American Standard Code for Information Interchange (ASCII) generation, logging, event handling, health monitoring, debugging, etc. ISCM 25 may comprise a finite state machine utility (FSMU) based application (e.g., which indicates an abstract state machine that can be in one of a finite number of states) including SM 26. In various embodiments, ISCM 25 may have a well-defined MTS seamless authentication protocol (MTS SAP) assigned and it can open a socket-based MTS queue and bind to the well-defined SAP such that other processes may communicate with it.

In various embodiments, ISCM 25 may also maintain an array of MTS operation code ("opcode"), which can define how to process a received MTS message. The array may include per-opcode specific MTS flags, handler functions, etc. ISCM 25 may be configured to receive CLI driven MTS messages, MTS notifications (such as event driven messages indicating, for example, that a particular VLAN is up or down), and MTS request/responses. In various embodiments, ISCM 25 may be configured so that MTS-based communication with other processes may be non-blocking and asynchronous. Thus, ISCM 25 may handle multiple events (which can arrive at any time) for the same resource such that the state of the resource is consistent (and not compromised).

During operation, when service appliance 14 is initially activated (e.g., powered on, or starts up), it may not be configured (e.g., have no configuration settings). In some cases, service appliance 14 is physically coupled to switch 12 (e.g., by one or more physical communication links, such as Ethernet cables). Service appliance 14 may be powered on. Powering on service appliance 14 may automatically start iSCC 30 to initialize and open to receiving RISE message from iSCM 25 on switch 12. The individual processes according to various embodiments may allow service appliance 14 to detect that port and/or communication channel utilizes RISE protocol. L2 bootstrap begins upon coupling service appliance 14 to switch 12 through corresponding switch ports 18 and appliance ports 20 and both devices are powered on. In various embodiments, appliance ports 20 may automatically be configured in RISE mode upon powering up service appliance 14. For example, a default mode for service appliance 14 is set to RISE mode (e.g., iSCC 30 is active) and appliance ports 20 are set in operation mode.

Subsequent to ports (e.g., appliance ports 20 and switch ports 18) being configured in RISE mode, auto-discovery and bootstrap may be performed by ISCM 25 and ISCC 30 to establish an appropriate control channel. During the configuration process, a RISE-Discovery Packet (RISE-DP) may sent out from switch 12 (e.g., using a multicast address). Service appliance 14 may respond with a response packet, performing a handshake to establish bootstrap. After the bootstrap is complete, the appropriate switch IP (e.g., supervisor IP) and the service appliance IP are made known to both devices for subsequent communication of RISE message 28 between service appliance 14 and switch 12. In some embodiments, ISCC 30 may receive an indication (e.g., L2 multicast message) from ISCM 25 of an event (e.g., special opcode indicating port bootstrap is complete) on any appliance port 20. In some embodiments, the indication of the event may comprise RISE message 28, or a data object, or an identifier, etc.

Note that prior to receiving the indication, service appliance 14 (and/or iSCC 30 thereon) may receive an ACL from iSCM 28 to enable the receipt of the indication. In this case, a special ACL is received by and applied on service appliance 14 so that it may automatically accept the L2 multicast messages. In order to receive the L2 multicast messages, the special ACL may be configured in advance of the execution of automatic configuration procedures.

After the control channel is established, applications in service appliance 14 may send control messages (e.g., using the UDP socket interface) to ISCC 30 through application control plane 32. Application control plane 32 generally encompasses one or more software components for performing workflow management, self-management, and other application control layer processes. ISCC 30 may forward the control messages to ISCM 25 of switch 12 over the control channel.

Note that the operations described herein execute on each appliance port 20 separately. In a general sense, service appliance 14 or application executing therein can use many appliance ports 20. When service appliance 14 is coupled to switch 12 by a plurality of communication channels (e.g., that link switch ports 18 with appliance ports 20), the operations may be executed on each of the plurality of communication channels. However, the operations may be bundled together from the perspective of service appliance 14. In some embodiments, if information received on all appliance ports 20 is identical, duplicate information is ignored or discarded. Moreover, any new information is compared against previously received information, and it is ignored if it is the same as previously received information. Such a mechanism advantageously prevents unnecessary reconfigurations when it is determined that the configuration information (e.g., configuration settings) has not changed.

In particular embodiments, a RISE service is created (e.g., by a network administrator or other user) on switch 12 and various RISE service attributes 22 are entered (e.g., through appropriate command line interface (CLI), graphical user interface (GUI) or other suitable data input interface). By way of examples and not as limitations, RISE service attributes 22 can include <service-type: RISE> (e.g., referring to RISE service created on switch 12); <mode-type: direct> (e.g., directly attached service appliance); <interface: po1> (e.g., assign first port channel to port po1 (e.g., 18(1)); <VLAN: 10> (e.g., assign control VLAN number 10); <VLAN group: 10> (e.g., assign default VLAN group); <IP: 10.1.1.1/24> (e.g., assign RISE IP address and NetMask>; <no shutdown> (e.g., enable the service). ISCM 25 in switch 12 may bundle RISE service attributes 22 into RISE message 28. In some embodiments, receipt of RISE message 28 on any appliance port 20 of service appliance 14 can trigger configuration on service appliance 14.

Upon receipt of RISE message 28 with RISE service attributes 22, iSCC 30 may trigger the auto configuration process on service appliance 14. iSCC 30 may instruct the various platform components of service appliance 14 to perform various configuration operations. In some embodiments, the instructions may be comprised in an appropriate data structure. In some implementations, the automatic configuration may comprise new service configuration procedures and/or port channel member update procedures. In other implementations, the message further comprises a plurality of fields, each of the plurality of fields being encoded as a TLV. At least a portion of the plurality of fields is converted (e.g., by the platform component in some embodiments; by iSCC 30 in some other embodiments; by a dedicated converter in yet other embodiments) to platform specific instructions, and the platform specific instructions are applied (e.g., by the platform component) as configuration settings for service appliance 14.

For a new (e.g., first-time, initial) service configuration, changing a port channel status on one of switch ports 18 (e.g., 18(1)) on switch 12 coupled to service appliance 14 from inactive to active status triggers start of a bootstrap protocol. The change of status from inactive to active may comprise an event, which may be perceived by ISCM 25 and trigger the bootstrap protocol. In some examples, a message is sent to service appliance 14 to indicate transition from an inactive state to an active state (i.e., the event).

One of appliance ports 20 (e.g., 20(1)) on service appliance 14 receives RISE message 28 (e.g., in a form of a control packet). Receipt of the RISE control packet is an event that triggers service appliance 14 to create an empty port channel. Port channel module 42 specifies a configuration setting for the port channel to be in a trunk mode (e.g., a mode that enables port trunking). Appliance port 20(1), on which RISE message 28 is received is added as a first member of the newly created port channel on service appliance 14. Note that before adding the port to the port channel, the port channel was empty; after adding the port to the port channel, the port channel has one member. Upon completion of the operation, appliance port 20(1) may be deemed to have completed a port bootstrapping protocol.

Any subsequent appliance ports (e.g., 20(2), 20(3)) receiving packets from the same service may be added to the port channel and may automatically inherit the port channel properties. The service may be identified from packet headers of RISE message 28. In other words, a service may transmit packets to each of the plurality of appliance ports 20 on the application (and/or service appliance 14). All ports that receive packets from a common service may be added to a same port channel. Any subsequent appliance port receiving a packet from same service is added to port channel and inherits properties from the port channel. For example, properties are applied to the appliance port(s) to match properties of the port channel and/or to match properties of other members in the port channel group.

Service appliance 14 maintains a mapping between services and port channels in service-PC map 44. In particular embodiments, service-PC map 44 includes information pertaining to the service, port channel name and member links (e.g., including ports) on service appliance 14. Service-PC map 44 may comprise a cache in a form of a database, data structure or any other appropriate storage/memory mechanism. Updates to the port channels may be handled based on service to port channel mapping maintained in service-PC map 44. In some implementations, service module 42 may compare a first version of service-PC map 44 (e.g., determined a first point in time) to a second version of service-PC map 44 (e.g., determined at a second point in time, later than the first point in time), which may have been updated due to a new member being added to or deleted from the port channel. Communication channels, ports, network interface cards (NICs) and/or members of the port channel may be updated based on a difference between the first version of service-PC map 44 and the second version of service-PC map 44.

In some examples, the update occurs based only on the difference between the first and second versions of service-PC map 44. For example, if the second version of the cache includes a new member that was not included in the first version of the cache, only the new member may be added to the service appliance (and the other members are not affected and are maintained). In contrast, some traditional systems update all of the members of the port channel regardless of whether they already existed at a previous point in time, which may disrupt communication over the ports during such an update.

If at a later time (e.g., subsequent to initial configuration), a new appliance port (e.g., 20(2)) is connected between switch 12 and service appliance 14, switch 12's port channel component sends an event indicator (e.g., an event object or message) to iSCM 25 (e.g., based on detecting a coupling of the new port to the switch). The bootstrap protocol is restarted. When the port bootstrap is restarted, a new mapping between services and port channels is determined (e.g., and stored in a new cache). The port bootstrapping process may be similar to the process described for the new service configuration procedures except that a separate cache is maintained (e.g., the cache established in new service configuration procedures is not modified). Subsequent to completion of a port bootstrap protocol in the new service configuration procedures (with corresponding generation of a first cache), the port bootstrap protocol is restarted in the port channel member update procedures to generate a new (second) cache.

Service appliance 14 compares (e.g., by executing a diff process) between a cache of current and previous port changes in service-PC map 44 by comparing the first cache and the second cache. The difference can be utilized to determine whether any new ports have been newly added or removed. For example, if appliance port 20(2) exists in the first cache and does not exist in the second cache, then appliance port 20(2) is determined to have been deleted in transition from the first to the second cache; on the other hand, if appliance port 20(2) does not exist in the first cache and exists in the second cache, then appliance port 20(2) may be determined to have been added in transition from the first cache to the second cache. In various embodiments, any added ports (e.g., detected based on the comparing) are added to the port channel, with no disruption to traffic on the other member ports of the port channel. Because the newly changed appliance ports are identified with specificity, changes may be made to the port channel group without refreshing the entire port channel group.

In some embodiments, the new service configuration procedures may be executed in a transition from one automatic configuration procedure to a next automatic configuration procedure. For example, after the port channel is established, iSCC 30 sends a data structure referred to as RISE entry to the several platform components of service appliance 14. Based on fields populated in the RISE entry, port channel module 40, service module 42, VLAN module 46, netconfig module 48, LACP module 50, ACL module 52 and RISE connection module 54 may configure various parameters and appliance ports 20 of service appliance 14, for example, by converting contents in the RISE entry data structure to platform specific configuration instructions. In various embodiments, the RISE entry data structure may be embedded in a payload of RISE message 28. RISE entry may comprise a container that captures various information to be exchanged between switch 12 and service appliance 14.

As used herein, the term "payload" refers to user data portion of a packet (e.g., message, such as RISE message 28), as opposed to control data, which is included in a "header" portion of the packet. The payload comprises the fundamental part of the transmitted data to the exclusion of metadata (e.g., overhead) information sent along with it to facilitate delivery.

Note that various operations are described herein with respect being performed (e.g., executed or otherwise carried out) by service appliance 14 or switch 12. In some cases, either one or both devices may be involved, at least part, in performing the operations. In some cases, switch 12 transmits an instruction to service appliance 14 to perform one or more of the operations. In some examples, only certain of the operations are executed, and certain other operations are not executed based on various particular configuration settings of service appliance 14 and/or switch 12.

Turning to the infrastructure of FIG. 1, the example network environment may be configured as one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in communication system 10, including switch 12 may include any type of network element connecting network segments. For example, switch 12 may include multi-port network bridges that processes and routes data at a data link layer (Layer 2). In another example, switch 12 may process data at a network layer (Layer 3), or Layer 4 (with network address translation and load distribution), or Layer 7 (load distribution based on application specific transactions) or at multiple layers (e.g., Layer 2 and Layer 3). In certain embodiments, functionalities of switch 12 may be integrated into other network devices, such as routers or servers. In various embodiments, switch 12 may be managed switches (e.g., managed using CLI, web interface, etc.).

As used herein, the term "port channel" refers to an aggregation of multiple physical interfaces into one logical interface, for example, to provide higher aggregated bandwidth, load balancing and link redundancy. In a general sense, port channels with multiple links can provide a high availability channel: if one link fails, traffic previously carried on this link can be switched to the remaining links. In some embodiments, the port channel may be physical; in other embodiments, the port channel may be virtual.

According to embodiments of the present disclosure, communication system 10 may provide for a fabric extender (FEX)-like protocol, auto-discovery, message transport service (MTS)—like control messages, and defined messages between service appliance 14 and switch 12. Configuration of service appliance 14 may be performed on switch 12 as for a line card. Data path forwarding may be off-loaded to network line cards in switch 12. Control path processing may be offloaded to supervisor engine 24 on switch 12 as appropriate. In embodiments where service appliance 14 has multiple virtual services (e.g., virtual machines), each virtual service may appear as a separate virtual line card on switch 12. Line card 16 comprises modular electronic circuits interfacing telecommunication lines such as copper wires or optical fibers to the rest of a telecommunications network.

In various embodiments, supervisor engine 60 may include several modules such as an installer, Ethernet port manager, port-channel manager, Quality of Service (QoS) manager, route policy manager, unified routing information base, access control list manager, and service policy manager for performing various routing and management functions, among others. iSCM 25 may execute in supervisor engine 24 to provide RISE related functionalities. iSCM 25 may manage one or more service modules, including in-chassis service modules and remote service modules.

In some embodiments, service appliance 14 may support stream control transmission protocol (SCTP), but may not support other protocols, such as MTS protocol. In the absence of native SCTP support in supervisor engine 24, tunneling over UDP may be enforced to send SCTP packets. A netstack module provisioned in supervisor engine 24 for implements TCP/IP stack for received frames hitting the control-plane of supervisor engine 24. Supervisor engine 24 may be configured with a virtual inband port that provides an interface for management traffic (such as auto-discovery) to a management processor.

Note that various types and numbers (i.e., larger or smaller number) of service appliances may be connected to switch 12 within the broad scope of the present disclosure.

Each service appliance would be configured with respective iSCCs as appropriate. In one embodiment, each iSCC may communicate with a single iSCM on switch 12. In another embodiment, each iSCC may communicate with respective separate iSCMs in switch 12. Other appropriate combinations of iSCCs and iSCMs may be possible within the broad scope of the present disclosure.

Figure 2:
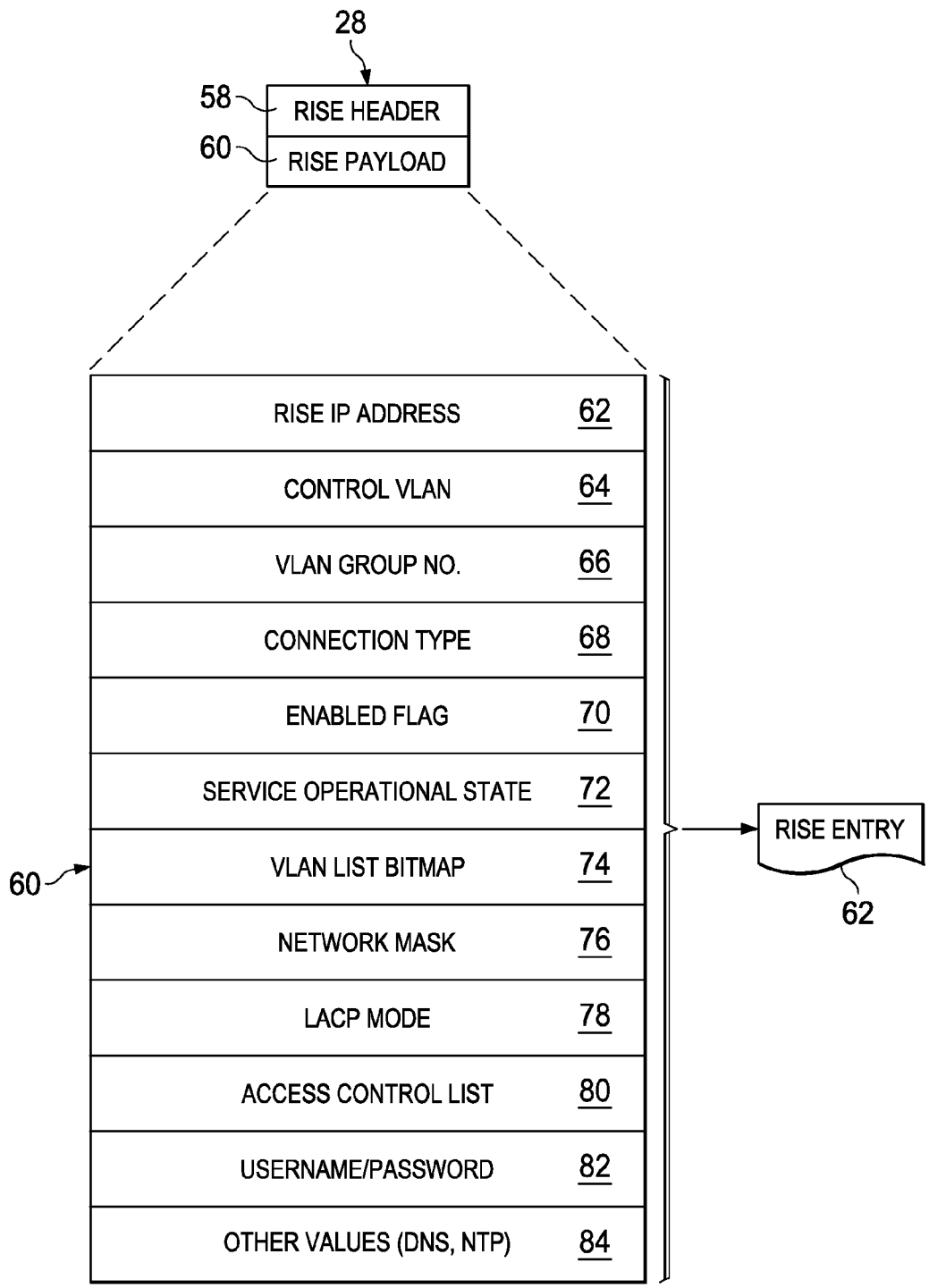
FIG. 2 is a simplified block diagram illustrating example details of the communication system in accordance with one embodiment.

Turning to FIG. 2, FIG. 2 is a simplified block diagram of example details of RISE message 28 according to an embodiment of communication system 10. RISE message 28 includes a RISE header 58 and a RISE payload 60. RISE header 58 may indicate the source, destination, and service name associated with RISE message 28. RISE payload 60 comprises a plurality of fields. In some embodiments, each of the plurality of fields may be encoded in TLV format. Some of the plurality of fields may be mandatory (e.g., service appliance 14 must support (e.g., identify) the fields and configure itself accordingly); some of the plurality of fields may be optional (e.g., service appliance 14 need not support the fields). The optional fields may be added during run-time (e.g., a data structure may applied more than once, the optional fields may be applied in the first and/or subsequent applications). The optional fields may dependent on (e.g., may correspond to) a set of features configured on switch 12. For example, some optional fields may only be available when a particular set of features is configured on switch 12.

Payload 60 may include a RISE IP Address field 62. The value therein corresponds to an IP address assigned to service appliance 14 by switch 12 (e.g., based on an input and/or by an administrator/manager). For example, the RISE IP Address may be the IP address assigned during Automatic IP Assignment. In some embodiments, the value may be an IPv4 address. ISCC 30 detects the value in RISE IP Address field 62. If the value is valid and is different from current configuration, the currently received address in RISE IP Address field 62 is assigned as the management IP of service appliance 14. In one example, the value in RISE IP Address field 62 is the NSIP for a Netscaler® device.

Payload 60 may include a control VLAN field 64. The value in VLAN field 64 corresponds to a control VLAN assigned to be used for control and management traffic between switch 12 and service appliance 14. VLAN module 46 may assign the value in VLAN field 64 to the control VLAN. In some embodiments, valid values of VLAN field 64 can range between 0-4096. When VLAN module 46 in service appliance 14 identifies a valid entry or an entry different from a current configuration, the value is assigned as the management VLAN of service appliance 14. The VLAN value is also added to the VLAN membership list of the applicable port channel. In one example, the value in VLAN field 64 is the NSVLAN for a Netscaler® device.

Payload 60 may include a VLAN group number field 66. The value of VLAN group number field 66 corresponds to a switch-wide unique number associating a set of VLANs used by service appliance 14 for data traffic. Example values include any in the range 0-16. Payload 60 may include a connection type field 68. The connection type can include direct connection or virtual port channel (VPC) service. Thus, the value may be ""DIRECT" or "VPC SERIVCE" (or an identifier corresponding to the connection type). When connection is in direct type, RISE connection module 54 configures service appliance 14 to only support a single connectivity to switch 12. When connection is in VPC type, RISE connection module 54 configures service appliance 14 to accept two identical bootstrap connections from a VPC pair. Service appliance 14 is also instructed to check whether all service parameters (e.g., service name, VLAN lists, RISE IP, RISE VLAN) match. If all service parameters do not match one another (e.g., there is a mismatch), a flag is raised.

Payload 60 may include an enabled flag field 70, the value of which represents a default state of the RISE service. The value may be "enabled" or "not enabled." By default, RISE is enabled. Payload 60 may include a service operational state field 72 indicative of a state of a service on switch 12. The value may be "active" or "inactive".

Payload 60 may include a VLAN list bitmap field 74, indicative of a list of VLANS represented as a 4096 bit key. If a bit is on, the corresponding VLAN represented by the bit is present in VLAN group. VLAN module 46 uses the VLAN list to configure VLANs on the port channel and add or delete VLANs to the VLAN membership list of port channel. Payload 60 may include a Network mask field 76, which indicates the network mask (Netmask) to be used on service appliance 14.

Payload 60 may include a LACP mode field 78, values of which can be "active," "passive," or "active|passive." If the LACP mode is already turned on at service appliance 14, the value in LACP mode field 78 may be ignored by service appliance 14. If the value indicates "active," LACP module 50 sets the port channel of service appliance 14 to active mode unconditionally. On the other hand, if the value indicates "passive," LACP module 50 sets the port channel of service appliance 14 to active mode when connected to switch 12 that has LACP activated.

Payload 60 may include an ACL field 80, including an ACL to be configured on service appliance 14. ACL module 52 applies the ACL indicated in ACL field 80 to traffic serviced by service appliance 14. In some embodiments, service appliance 14 can also send ACLs to supervisor engine 24 in RISE message 28 from service appliance 14 to switch 12.

Payload 60 may include a username/password field 82 indicative of a username and password used by service appliance 14 and/or a user logging into service appliance 14. The username/password can be communicated using SSH or current encryption messages in a RISE encrypted control channel. In some embodiments, the user can also attach the username/password to service appliance 14 and change the details during run time of service appliance 14. Payload 60 may include field 84 indicative of other values, such as DNS, NTP, etc. Netconfig module 48 may apply the values in field 84 to appropriate configuration settings of service appliance 14. In various embodiments, values in payload 60 may be parsed, identified, extracted, and/or transformed into RISE entry 62, comprising a container (e.g., data structure) that can be understood by the relevant platform components in service appliance 14.

Figure 3:
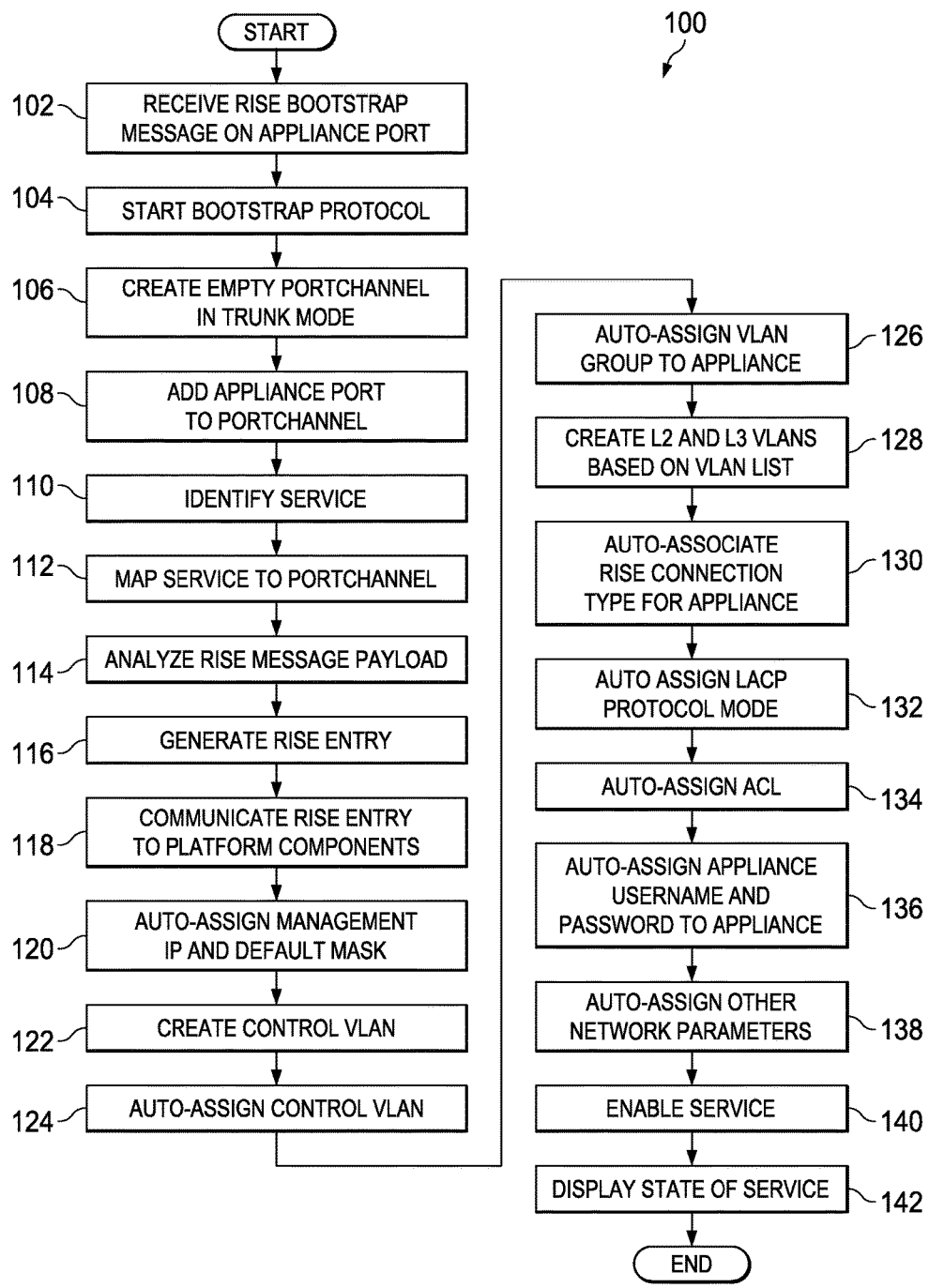
FIG. 3 is a simplified flow-chart illustrating example operations that may be associated with an embodiment of the communication system.

Turning to FIG. 3, FIG. 3 is a simplified flow diagram illustrating example operations 100 that may be associated with embodiments of communication system 10. At 102, ISCC 30 on service appliance 14 receives bootstrap message, indicative of an event (e.g., port connected, or RISE message 28), on one of appliance ports 20 (e.g., 20(1)). At 104, iSCM 25 and iSCC 30 may initiate the bootstrap protocol. At 106, port channel module 40 at service appliance 14 may create an empty port channel in trunk mode. At 108, port channel module 40 may add appliance port 20(1) (e.g., on which the bootstrap message was received) to the port channel. At 110, service module 42 may identify the service that sent the bootstrap message. At 112, service module 42 maps the service to the port channel and creates a cache in service-PC map 44.

At 114, iSCC 30 at service appliance 14 may analyze RISE payload 60 of RISE message 28. In some embodiments, RISE message 28 may be received substantially simultaneously with the bootstrap message. In other embodiments, RISE message 28 may be received at a later time, after the port channel is established and the bootstrap protocol completed. At 116, service appliance 14 generates RISE entry 62 from information in RISE payload 60. At 118, ISCC 30 communicates RISE entry 62 to platform components in service appliance 14 over IPC 57.

At 120, service appliance 14 auto-assigns a management IP and default netmask to itself based on the value in RISE IP address field 62 and Network mask field 76. At 122, VLAN module 46 at service appliance 14 creates a control VLAN based on the value of VLAN field 64 and assigns it to the management VLAN. At 126, VLAN module 46 auto-assigns a VLAN group to service appliance 14 based on the value of VLAN Group number field 66. At 128, VLAN module 46 creates L2 VLANs and L3 interfaces based on the VLAN list bitmap field 74. At 130, RISE connection module 54 auto-associates the RISE connection type for service appliance 14 based on the value in connection type field 68. At 132, LACP module 50 auto-assigns LACP protocol mode to the port channel. At 134, ACL module 52 auto-assigns ACLs to appliance ports 20. At 136, netconfig module 48 auto-assigns appliance username and password based on values in the username/password field 82. At 138, netconfig module 48 auto-assigns other network parameters (e.g., NTP, DNS, etc.) based on values in field 84. At 140, service module 42 enables the RISE service with the configuration parameters applied based in values in RISE entry 62. At 142, a state (e.g., active, inactive) of the service may be displayed on switch 12.

Figure 4:
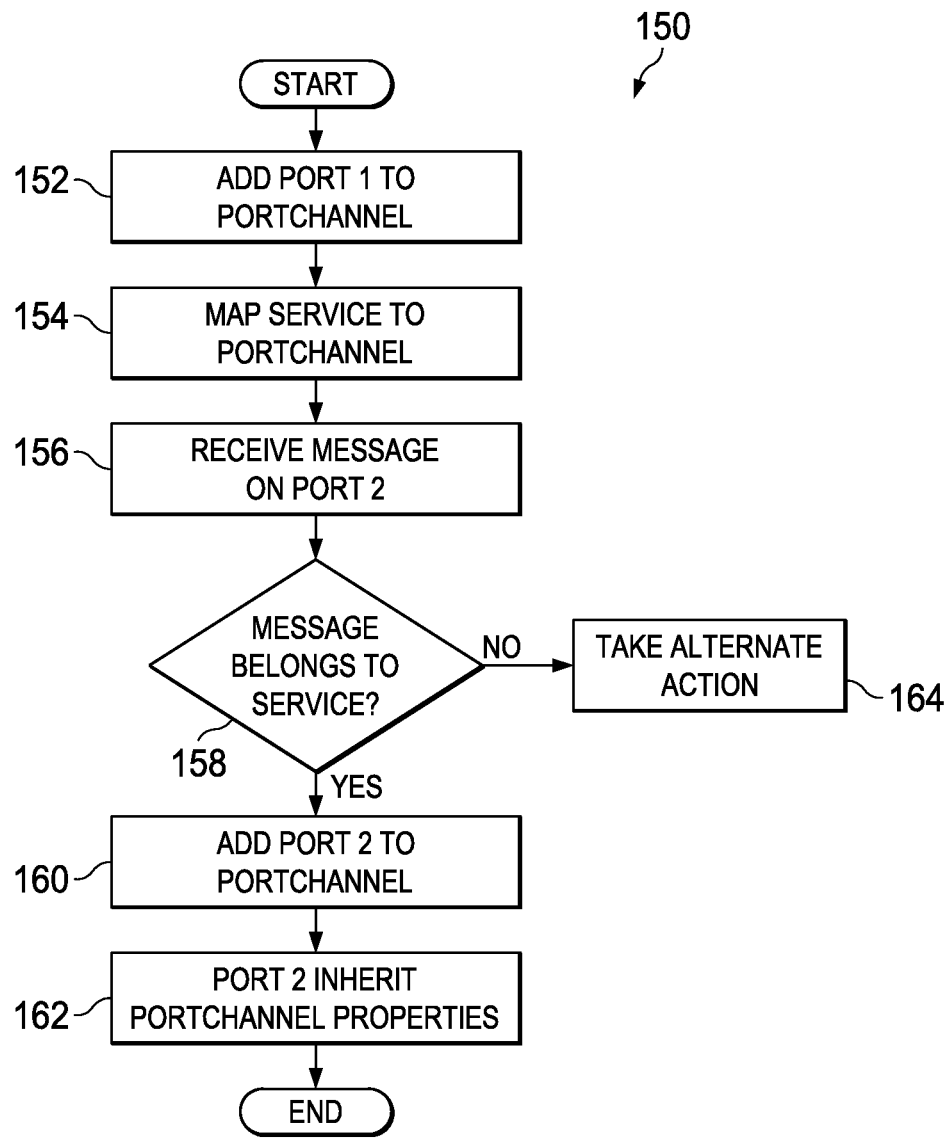
FIG. 4 is a simplified flow-chart illustrating other example operations that may be associated with an embodiment of the communication system.

Turning to FIG. 4, FIG. 4 is a simplified flow diagram illustrating example operations 150 that may be associated with embodiments of communication system 10. At 152, appliance port (e.g., 20(1)) may be added to a port channel. At 154, a service (e.g., RISE service) may be mapped to the port channel. At 156, a message may be received on a second appliance port (e.g., 20(2)). At 158, a determination may be made whether the message belongs to the service (e.g., whether message is sent by the service, or is otherwise associated with the service). The determination may be made by inspecting a header of the message, in some embodiments, in which the service may be identified suitably (e.g., service code, service name, etc.). If the message belongs to the service, at 160, the second appliance port (e.g., 20(2)) may be added to the port channel. At 162, the second appliance port (e.g., 20(1)) may inherit (e.g., automatically) the properties of the port channel. On the other hand, if at 158, it is determined that the message does not belong to the service, at 164, an alternate action may be taken. Such alternate action may include, by way of examples, and not as limitations, dropping the message, creating another port channel, and adding the appliance port on which the message was received to the new port channel, etc.

Figure 5:
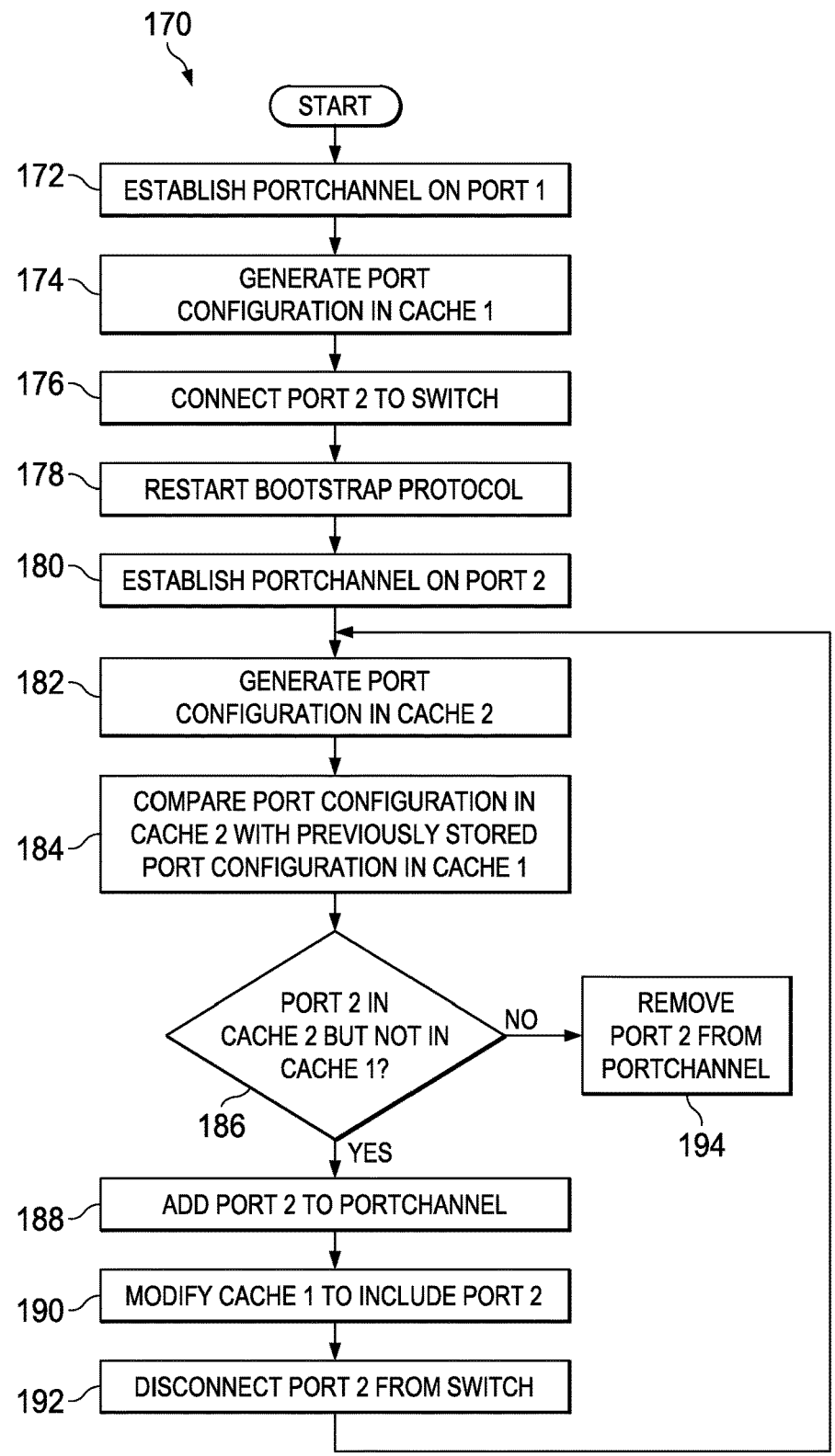
FIG. 5 is a simplified flow-chart illustrating yet other example operations that may be associated with an embodiment of the communication system.

Turning to FIG. 5, FIG. 5 is a simplified flow diagram illustrating example operations 170 that may be associated with embodiments of communication system 10. At 172, a port channel may be established on one of appliance ports 20 (e.g., 20(1)). At 174, a port configuration mapping appliance port 20(1) to the port channel may be generated and stored in a cache (e.g., cache 1). At 176, a second appliance port (e.g., 20(2)) may be connected to corresponding switch port 18 (e.g., 18(2)) at switch 12. At 178, the activation of switch port 18(2) triggers initiation of a bootstrap protocol, and the bootstrap protocol may be restarted on second appliance port 20(2). At 180, the port channel may be established on second appliance port 20(2). At 182, another port configuration that maps second appliance port 20(2) to the port channel may be generated and stored in another cache (e.g., cache 2).

At 184, the port configuration in cache 2 may be compared with the previously stored port configuration in cache 1. At 186, a determination may be made whether second appliance port 20(2) is in cache 2 but not in cache 1. If so, at 188, second appliance port 20(2) may be added to the port channel. At 190, the cache (e.g., cache 1) may be modified to include second appliance port 20(2) to the port channel.

Assume that at a later time, at 192, second appliance port 20(2) is disconnected from switch 12. The operations step to 182, at which the port change triggers generation of new port configuration in cache 2. A comparison between the new cache 2 and previously modified cache 1 is made at 184. At 186, a determination may be made whether second appliance port 20(2) is in cache 2 but not in cache 1. In this case, second appliance port 20(2) is in cache 1, but not in cache 2. Therefore, the operations step to 194, and second appliance port 20(2) is removed from the port channel.

Note that in various embodiments, cache 1 and cache 2 may be included in service-PC map 44. For example, service-PC map 44 may include an association between a service communicating over a port channel, and the ports that are included in the port channel. Thus, messages by the service may be received at any one of the ports included in the port channel and associated with the service and port channel in service-PC map 44.

Note that the numerical and letter designations assigned to the elements of the FIGURES do not connote any type of hierarchy; the designations are arbitrary and have been used for purposes of teaching only. Such designations should not be construed in any way to limit their capabilities, functionalities, or applications in the potential environments that may benefit from the features of communication system 10.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, service appliance 14 and switch 12. In some embodiments, one or more of these features may be implemented in hardware, provided external to these elements, or consolidated in any appropriate manner to achieve the intended functionality. Service appliance 14 and/or switch 12 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 12 and service appliance 14 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 38) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, processor 36 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 38) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the communication system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at an appliance port on a service appliance, an indication that a switch port on a switch changed from an inactive status to an active status, the appliance port being connected over a network to the switch port;
   starting a bootstrap protocol by a client process executing in the service appliance, wherein the client process starts the bootstrap protocol after receiving a first bootstrap message from a service executing in the switch;
   creating, by a port channel module executing in the service appliance, an empty port channel at the service appliance;
   adding, by the port channel module, the appliance port to the port channel;
   identifying, by a service module executing in the service appliance, the service in the switch that sent the first bootstrap message;
   associating, by the service module, the service to the port channel in a cache in the service appliance;
   receiving at a second appliance port on the service appliance, a second bootstrap message from the service; and
   adding the second appliance port to the port channel.

2. The method of claim 1, wherein the first bootstrap message includes a payload with a plurality of service attributes indicative of configuration settings of the service appliance.

3. The method of claim 2, wherein the service attributes in the payload are communicated to platform components in the service appliance, wherein the platform components apply configuration settings to the service appliance based on the service attributes.

4. The method of claim 3, wherein the service attributes are communicated to the platform components in a Remote Integrated Service Engine (RISE) entry data structure.

5. The method of claim 3, wherein the service attributes are communicated to the platform component using Inter-Process Communication (IPC) in an application control plane of the service appliance.

6. The method of claim 1, further comprising:
receiving, at the second appliance port on the service appliance, an indication that a second switch port on the switch changed from an inactive status to an active status, the second appliance port being connected over the network to the second switch port;
restarting the bootstrap protocol to add the second appliance port to the port channel.

7. The method of claim 6, wherein restarting the bootstrap protocol comprises:
associating the service with the port channel in a second cache, the second cache comprising the second appliance port, wherein the method further comprises comparing the second cache with the previously stored cache.

8. The method of claim 1, wherein the first bootstrap message is encoded according to Remote Integrated Service Engine (RISE) protocol.

9. The method of claim 8, wherein the client process comprises an intelligent service card client process (iSCC) on the service appliance, wherein the iSCC communicates the first bootstrap message with a corresponding intelligent service card manager process (iSCM) at the switch over the port channel.

10. Non-transitory media that includes instructions for execution, which when executed by a processor is operable to perform operations comprising:
receiving, at an appliance port on a service appliance, an indication that a switch port on a switch changed from an inactive status to an active status, the appliance port being connected over a network to the switch port;
starting a bootstrap protocol by a client process executing in the service appliance, wherein the client process starts the bootstrap protocol after receiving a first bootstrap message from a service executing in the switch;
creating, by a port channel module executing in the service appliance, an empty port channel at the service appliance;
adding, by the port channel module, the appliance port to the port channel;
identifying, by a service module executing in the service appliance, the service in the switch that sent the first bootstrap message;
associating, by the service module, the service to the port channel in a cache in the service appliance;
receiving at a second appliance port on the service appliance, a second bootstrap message from the service; and
adding the second appliance port to the port channel.

11. The media of claim 10, wherein the first bootstrap message includes a payload with a plurality of service attributes indicative of configuration settings of the service appliance.

12. The media of claim 10, wherein the operations further comprise:
receiving, at the second appliance port on the service appliance, an indication that a second switch port on the switch changed from an inactive status to an active status, the second appliance port being connected over the network to the second switch port;
restarting the bootstrap protocol to add the second appliance port to the port channel.

13. The media of claim 12, wherein restarting the bootstrap protocol comprises:
associating the service with the port channel in a second cache, the second cache comprising the second appliance port, wherein the processor is operable for comparing the second cache with the previously stored cache.

14. An apparatus, comprising:
a memory for storing data; and
a processor operable to execute instructions associated with the data, wherein the processor and the memory cooperate, such that the apparatus is configured for:
receiving, at an appliance port on a service appliance, an indication that a switch port on a switch changed from an inactive status to an active status, the appliance port being connected over a network to the switch port;
starting a bootstrap protocol by a client process executing in the service appliance, wherein the client process starts the bootstrap protocol after receiving a first bootstrap message from a service executing in the switch;
creating, by a port channel module executing in the service appliance, an empty port channel at the service appliance;
adding, by the port channel module, the appliance port to the port channel;
identifying, by a service module executing in the service appliance, the service in the switch that sent the first bootstrap message;
associating, by the service module, the service to the port channel in a cache in the service appliance;
receiving at a second appliance port on the service appliance, a second bootstrap message from the service; and
adding the second appliance port to the port channel.

15. The apparatus of claim 14, wherein the first bootstrap message includes a payload with a plurality of service attributes indicative of configuration settings of the service appliance.

16. The apparatus of claim 14, wherein the operations further comprise:
receiving, at the second appliance port on the service appliance, an indication that a second switch port on the switch changed from an inactive status to an active status, the second appliance port being connected over the network to the second switch port;
restarting the bootstrap protocol to add the second appliance port to the port channel.

17. The apparatus of claim 16, wherein restarting the bootstrap protocol comprises:
associating the service with the port channel in a second cache, the second cache comprising the second appliance port, wherein the apparatus is further configured for comparing the second cache with the previously stored cache.

18. The method of claim 1, further comprising:
  associating the service with the port channel in a second cache, the second cache comprising the second appliance port; and
  comparing the second cache with the previously stored cache.

19. The media of claim 10, wherein the operations further comprise:
  associating the service with the port channel in a second cache, the second cache comprising the second appliance port; and
  comparing the second cache with the previously stored cache.

20. The apparatus of claim 14, further configured for:
  associating the service with the port channel in a second cache, the second cache comprising the second appliance port; and
  comparing the second cache with the previously stored cache.

\* \* \* \* \*